United States Patent [19]
Hamilton

[11] 3,984,937
[45] Oct. 12, 1976

[54] FLYSWATTER DEVICE
[76] Inventor: Robert E. Hamilton, 822 - 4th, Grinnell, Iowa 50112
[22] Filed: July 21, 1975
[21] Appl. No.: 597,834

[52] U.S. Cl. ............................................. 43/137
[51] Int. Cl.² ........................................ A01M 3/02
[58] Field of Search ............... 43/137, 134; 128/54

[56] References Cited
UNITED STATES PATENTS
| | | | |
|---|---|---|---|
| 2,131,534 | 9/1938 | Gatch | 43/137 |
| 2,934,851 | 5/1960 | Grish | 43/137 |

FOREIGN PATENTS OR APPLICATIONS
290,172   5/1966   Australia .............................. 43/137

*Primary Examiner*—Warner H. Camp
*Attorney, Agent, or Firm*—Zarley, McKee, Thomte & Voorhees

[57] ABSTRACT

A flyswatter device comprising an elongated handle portion having a flat head portion at one end thereof. A layer of material is provided on at least one side of the head portion. The layer of material is capable of receiving and holding a static electrical charge sufficient to cause flies or the like to adhere thereto.

1 Claim, 2 Drawing Figures

FLYSWATTER DEVICE

BACKGROUND OF THE INVENTION

Flyswatters have long been used to kill flies or the like. The problem existing with the conventional flyswatter is that once the fly has been struck by the flyswatter, it is ordinarily necessary for the individual to pick up the fly and deposit the same in a garbage can or the like. Needless to say, this task is distasteful at best.

Therefore, it is the principal object of the invention to provide a flyswatter device including means for causing the fly to adhere thereto.

A further object of the invention is to provide a flyswatter device which enables a person to pick up the flies from the floor or the like without actually handling the same.

A further object of the invention is to provide a flyswatter device having one surface thereon which is capable of receiving and holding a static electrical charge sufficient to cause the flies or the like to electrically adhere thereto.

A still further object of the invention is to provide a flyswatter device which is economical to manufacture, durable in use, and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
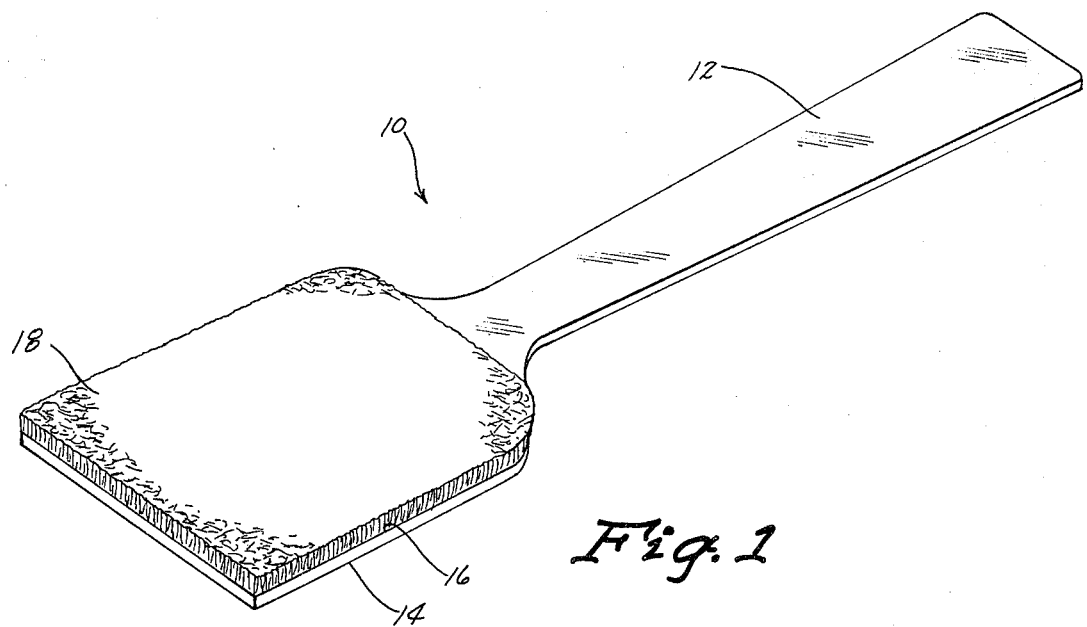
FIG. 1 is a perspective view of the flyswatter of this invention.
Figure 2:
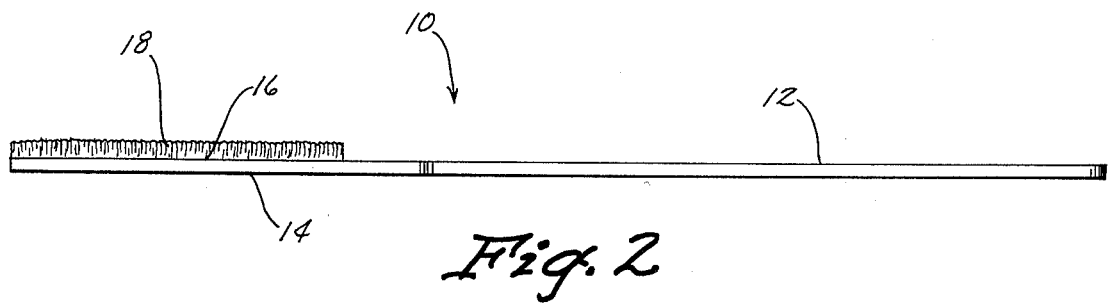
FIG. 2 is a side elevational view of the device.

The flyswatter of this invention is referred to generally by the reference numeral 10 and generally comprises a handle portion 12 having a head portion 14 provided at one end thereof. The head portion 14 is provided with at least one substantially flat surface 16 upon which is provided a layer 18 of material which is capable of receiving and holding a static electrical charge. The layer 18 may be comprised of Nylon, Orlon, or Fiberglas. While the device is described as having a single layer 18 it should be noted that a layer identical to layer 18 could be provided on the opposite side of the head portion. In use, the flyswatter 10 is used in conventional fashion to swat flies or the like. When a fly is struck by layer 18, the static electrical charge therein will cause the fly to adhere thereto. The flyswatter may be then placed in a wastebasket or the like and struck against the inside surface of the basket or otherwise shaken to cause the fly to disengage from the layer 18. If the fly is on the floor or the like, the fly may be picked up by simply causing the layer 18 to be placed in contact with the fly so that the fly will adhere thereto.

Thus, it can be seen that a unique flyswatter has been provided which causes flies or the like to adhere thereto so that it is not necessary to manually grasp the fly or otherwise handle the same. Thus it can be seen that the flyswatter of this invention accomplishes at least all of the stated objectives.

I claim:
1. A flyswatter device comprising,
   a handle of unitary construction terminating in an enlarged head portion having a substantially flat surface,
   a layer of material extending completely over said head portion and being of a material different than said head and handle portions, said layer of material being capable of receiving and holding a static electrical charge sufficient to cause flies to electrically adhere thereto.

* * * * *